US009951839B2

(12) United States Patent
Baalmann et al.

(10) Patent No.: US 9,951,839 B2
(45) Date of Patent: Apr. 24, 2018

(54) PRELOADING DEVICE FOR A PISTON VALVE OF A VIBRATION DAMPER

(71) Applicant: ZF Friedrichshafen AG

(72) Inventors: Helmut Baalmann, Bergrheinfeld (DE); Hassan Asadi, Schweinfurt (DE); Hans Gonschorrek, Bergrheinfeld (DE); Lothar Krill, Eitorf (DE); Alexander Kruse, Werneck (DE); Oswald Lichtlein, Bergtheim (DE); Dirk Litterscheid, Eitorf (DE); Thomas Manger, Wasserlosen (DE); Heinz Sydekum, Dittelbrunn (DE); Harun Tucovic, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/114,165

(22) PCT Filed: Dec. 17, 2014

(86) PCT No.: PCT/EP2014/078150
§ 371 (c)(1),
(2) Date: Jul. 26, 2016

(87) PCT Pub. No.: WO2015/113703
PCT Pub. Date: Aug. 6, 2015

(65) Prior Publication Data
US 2017/0002887 A1    Jan. 5, 2017

(30) Foreign Application Priority Data

Jan. 28, 2014 (DE) .................. 10 2014 201 480

(51) Int. Cl.
*F16F 9/34* (2006.01)
*F16F 9/348* (2006.01)

(52) U.S. Cl.
CPC .......... *F16F 9/3488* (2013.01); *F16F 9/3485* (2013.01)

(58) Field of Classification Search
CPC .......... F16F 9/348; F16F 9/3485; F16F 9/3488
(Continued)

(56) References Cited

U.S. PATENT DOCUMENTS 3,209,868 A * 10/1965 De Koning ............. F16F 9/348
137/493.9
4,830,152 A   5/1989 Rauert
(Continued)

FOREIGN PATENT DOCUMENTS

DE    969330     5/1958
DE    1151971    7/1963
(Continued)

*Primary Examiner* — Thomas J Williams
(74) *Attorney, Agent, or Firm* — Cozen O'Connor

(57) ABSTRACT

A preloading device for a piston valve of a vibration damper includes a spring element which is fitted by an inner diameter onto a radially inner centering device which serves for inner centering of the spring element in the installed state of the preloading device. To provide a preloading device for a piston valve by which a reliable inner centering of a spring element can be ensured but which can be placed with low expenditure on assembly at the same time, the spring element is axially fixed at the centering device via retaining means in that the retaining means at least partially enclose the spring element axially on both sides and are rigidly connected to the centering device in each instance.

16 Claims, 2 Drawing Sheets

(58) Field of Classification Search
USPC .......................................... 188/322.13, 322.15
See application file for complete search history.

(56) References Cited

U.S. PATENT DOCUMENTS

| | | | | |
|---|---|---|---|---|
| 6,336,536 B1* | 1/2002 | Fenn | ..................... | F16F 9/3485 188/282.6 |
| 6,868,947 B2* | 3/2005 | Adamek | ............... | F16F 9/3228 188/282.5 |
| 2010/0181518 A1* | 7/2010 | Kowalski | .............. | F16F 9/3485 251/324 |

FOREIGN PATENT DOCUMENTS

| | | |
|---|---|---|
| DE | 1200624 | 9/1965 |
| DE | 1242056 | 6/1967 |
| DE | 3701557 | 8/1988 |
| DE | 102007004149 | 8/2007 |

* cited by examiner

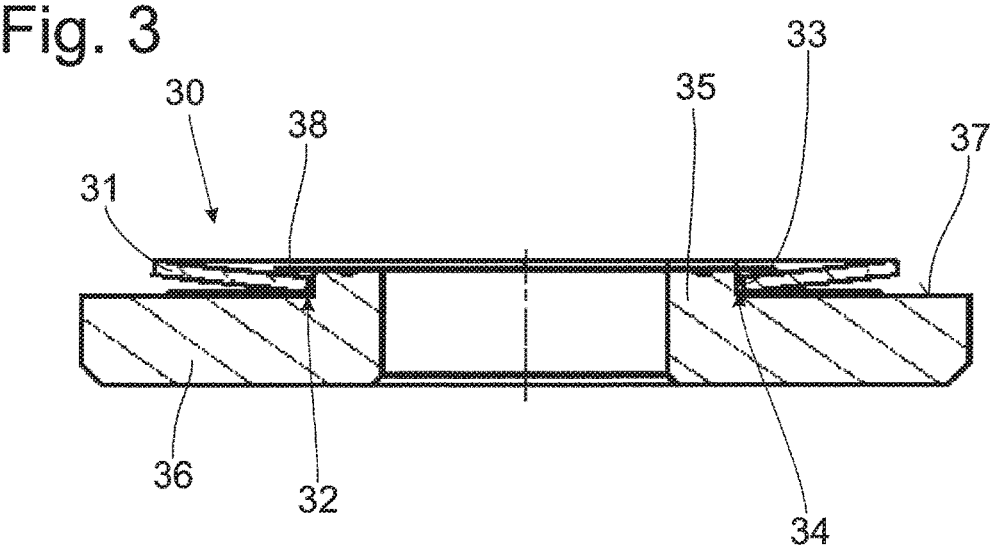
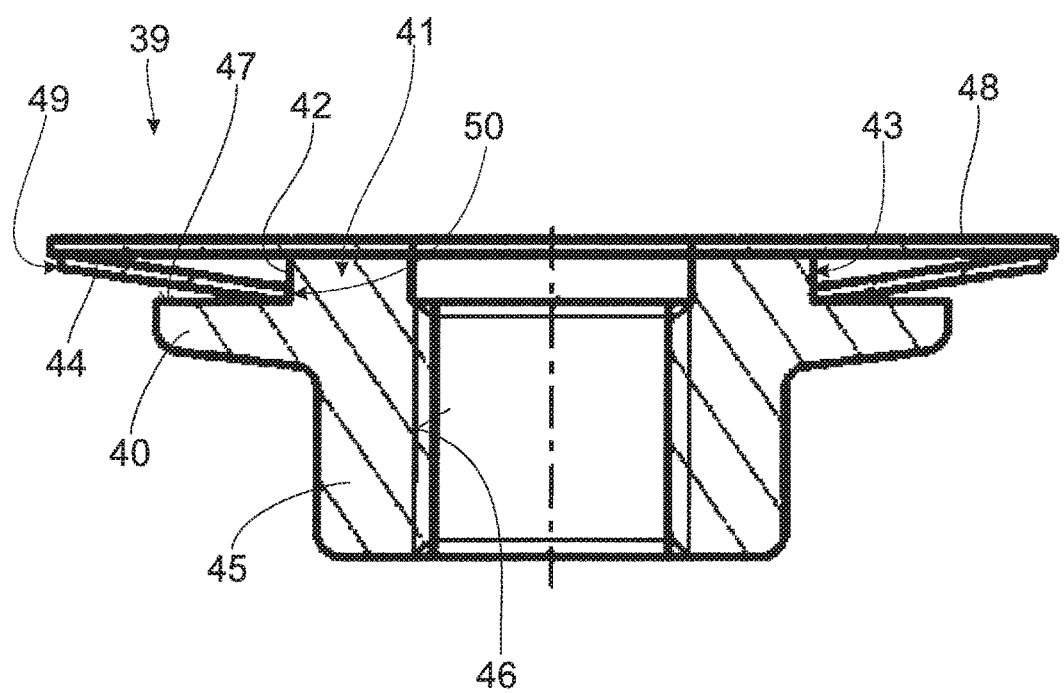

PRELOADING DEVICE FOR A PISTON VALVE OF A VIBRATION DAMPER

PRIORITY CLAIM

This is a U.S. national stage of application No. PCT/EP2014/078150, filed on Dec. 17, 2014. Priority is claimed on the following application: Country: Germany, Application No.: 10 2014 201 480.8, Filed: Jan. 28, 2014, the content of which is/are incorporated herein by reference in its entirety.

FIELD OF THE INVENTION

The invention is directed to a preloading device for a piston valve of a vibration damper comprising a spring element which is fitted by an inner diameter onto a radially inner centering device which serves for inner centering of the spring element in the installed state of the preloading device. The invention is further directed to a piston valve for a vibration damper in which an above-mentioned preloading device is applied.

BACKGROUND OF THE INVENTION

In motor vehicles, vibration dampers are mostly applied in the form of hydraulic-mechanical dampers and are provided particularly between a respective vehicle body and the axles of the respective motor vehicle. On the one hand, a vibration damper placed at this location prevents rocking and after-vibration of the vehicle body when excited by the roadway or over the course of certain driving states and, on the other hand, brings about a rapid attenuation of a vibration that is excited in a respective vehicle wheel by the roadway so that road grip of this vehicle wheel can always be guaranteed.

Vibration dampers are commonly constructed as telescoping shock absorbers in the form of mono-tube dampers or twin-tube dampers. A damping action is achieved through displacement of a damping medium, usually in the form of a hydraulic fluid, and the flow of the damping medium is influenced over the course of the displacement usually via a piston rod which is provided with a plurality of passages for this purpose. Damping characteristic curves of the vibration damper are then usually adjusted via hydraulic resistances which correspondingly influence the flow of the damping medium via the passages and which are often constructed as valve disks which are preloaded against a piston body of the piston valve. Spring elements are provided among others for preloading the valve disks and always guarantee a sufficient preloading of the valve disks. However, a reliable centering of the spring elements must be ensured because faulty assembly and, therefore, diverging valve characteristics can otherwise occur in batch fabrication.

DE 10 2007 004 149 A1 shows a piston valve for a vibration damper comprising a piston body with a plurality of passages extending axially through the piston body. A plurality of valve disks are preloaded against a respective valve seat at the piston body in the region of orifices of the passages, the preloading being brought about by an associated preloading device. This preloading device comprises a disk spring and a radially inner, annular centering disk which forms a centering device for the disk spring and ensures an inner centering of the disk spring on a piston rod neck on which the piston body is also guided. However, a spring is additionally provided because the disk spring can move axially relative to the centering disk in the course of assembling the piston valve, which can result in a faulty assembly of the piston valve during preloading of the piston valve via a fastening nut. This spring preloads the centering disk against a supporting disk of the piston valve and accordingly always holds the latter in a position in which the centering disk can realize its centering function.

Proceeding from the prior art described above, it is an object of the present invention to provide a preloading device for a piston valve by which a reliable inner centering of a spring element can be ensured over the course of assembling the piston valve, but which can be placed with low expenditure on assembly at the same time.

According to the invention, a preloading device comprises a spring element which is fitted by an inner diameter onto a radially inner centering device. The centering device serves for inner centering of the spring element in the installed state of the preloading device in a piston valve. According to the invention, a preloading device of this type is then preferably applied in a piston valve which comprises a piston body with at least one passage extending axially through the piston body. This at least one passage can be covered at the orifice thereof by at least one valve disk which is preloaded against the piston body by means of a preloading device according to the invention.

Within the meaning of the invention, an "inner centering" of the spring element of the preloading device means a guiding of the spring element at its inner diameter by means of the radially inner centering device in order to hold this spring element in the correct position during the assembly of the piston valve. In particular, the radially inner centering device centers the spring element during assembly of the piston valve indirectly on a piston rod neck of a piston rod of the vibration damper.

The invention includes the technical teaching that the spring element is axially fixed at the centering device via retaining means in that the retaining means at least partially enclose the spring element axially on both sides and are rigidly connected to the centering device in each instance. In other words, the spring element is held axially at the centering device by retaining means, for which purpose at least a portion of the spring element lies axially between the retaining means, and the retaining means are fixedly coupled to the centering device in each instance.

This type of configuration of a preloading device has the advantage that a pre-assemblable constructional unit is consequently furnished and is simply provided on the piston rod of the respective vibration damper in the course of assembling the piston valve, and a reliable inner centering of the spring element is always ensured as a result of the relative fixing of the spring element with respect to the radially inner centering device. With the aid of the retaining means, the spring element is fixed to the centering device in a positive engagement in axial direction due to the fact that it is at least partially axially enclosed and accordingly always remains with its inner diameter correctly positioned with respect to the centering device. This can prevent the spring element from creeping axially out of the centering device in an unwanted manner in the course of assembling the piston valve so as to rule out the risk of a faulty assembly of the spring element as a result of deficient inner centering. Further, owing to the arrangement of the preloading device as a pre-assemblable constructional unit, expenditure on assembly is reduced because it need merely be fitted on additionally as a unit, i.e., positioned on the piston rod neck.

In the case of DE 10 2007 004 149 A1, a reliable inner centering of the spring element is also ensured in that the centering disk defining the centering portion is preloaded against a supporting disk of the piston valve via a spring. However, assembly of this preloading device is more complicated because the individual parts must be placed successively during assembly and a preassembled unit is not formed. Further, faulty assembly cannot be entirely ruled out in spite of the preloading of the centering disk because relative movements between the centering disk and the spring element are possible in principle.

According to the invention, "radial" means an orientation along a radius of the spring element, while "axial" means an orientation in a tensioning direction of the spring element, which in the installed state of the preloading device corresponds to an orientation in direction of a longitudinal central axis of a piston rod of the vibration damper.

Further, the retaining means "at least partially" enclosing the spring element axially on both sides means that the retaining means radially overlap the spring element at least over a portion of the extension of the spring element and are provided in axial direction respectively on each side of the spring element. However, at least one of the retaining means can also completely overlap the axially adjacent spring element in radial direction.

Finally, the phrase "rigid connection" between the retaining means and the centering portion includes the meaning that the respective retaining means and the centering portion are fixedly coupled with one another at least in axial and radial direction. In a particularly preferred manner, however, the respective retaining means are immovable in their entirety with respect to the centering portion, which can be realized by a corresponding connection or also by means of an integral construction.

In accordance with an embodiment form of the invention, the centering device is formed by a centering disk which guides the spring element at an outer diameter. In this case, the inner centering of the spring element is realized via a corresponding disk which is provided radially inwardly of the spring element and to which the retaining means are connected. Consequently, a preloading device which is particularly compact axially can be implemented.

According to an alternative embodiment form of the invention, the centering device is formed by an outer diameter of an axially projecting flange portion of a supporting disk which is additionally defined by a radially extending shoulder portion of one of the retaining means. Accordingly, in this case the inner centering is realized via a correspondingly configured supporting disk which, together with a further supporting disk, serves inside a piston rod to intermediately receive the piston body, the spring elements and the valve disks. In this respect, the inner centering and the supporting function can be combined in one component part which, with the shoulder portion, forms an axial contact for the spring element.

In a further development of the above-mentioned embodiment form, the supporting disk is provided on an axial side remote of the flange portion with a hex exterior and is further outfitted with an internal thread at an inner diameter at least along a portion of its extension. In this way, the function of a fastening nut can be additionally integrated allowing a further reduction in the quantity of component parts, by which a further simplification of assembly can be realized.

According to a further embodiment form of the invention, at least one of the retaining means is formed in each instance by a retaining disk which is connected to the centering device. Consequently, particularly in case the centering device is formed by a centering disk, there are to be two retaining disks of this kind provided which are to be connected to the centering disk after the spring element and centering disk are positioned relative to one another in a corresponding manner. In case the centering device is formed via a supporting disk, however, only one retaining disk is to be provided.

In a further development of the invention, the spring element is enclosed axially between the retaining means only in the region of its inner diameter. Accordingly, the spring element can be inserted loosely between the retaining means so that the connection of the retaining means to the centering device is not loaded by a preloading force of the spring element. A preloading of the spring element is then first carried out during assembly of the piston valve and application of a clamping force via the respective fastening nut.

In accordance with an alternative embodiment of the invention, one of the retaining means is formed by a valve disk which is connected to the centering device and to which a preloading force is applied through the spring element. Accordingly, in this case one of the retaining means is formed directly by one of the valve disks to be preloaded allowing a further integration of functions. However, in this case a preloading of the spring element is carried out already during the formation of the preassembled constructional unit and consequently the connection of the valve disk to the centering device is also loaded by the preloading force of the spring element.

In a further development of the invention at least one of the retaining means is connected to the centering device by means of a joining process. This joining process is preferably a welding of the two components, for example, laser welding; however, another kind of welding method is also conceivable, as is soldering, gluing or an interference fit. Further, at least one of the retaining means can also be formed integral with the centering device.

In a further embodiment form of the invention, the spring element is a disk spring. A preloading of the at least one valve disk of the piston valve can be realized in an axially compact manner by means of a disk spring. Alternatively, however, the spring element can also be constructed in some other way, for example, as a corrugated spring or a helical spring, and in the latter case preferably has a conical cross section.

The invention is not limited to the combination of features specified in the main claim or the claims depending on the latter. Further, there are possibilities for combining individual features also insofar as they follow from the claims, the following description of preferred embodiment forms or directly from the drawings. Reference made to the drawings in the claims by the use of reference numerals is not intended to limit the scope of protection of the claims.

BRIEF DESCRIPTION OF THE DRAWINGS

Advantageous embodiments of the invention are described in the following and are shown in the drawings in which:

FIG. 3 is a sectional view of a preloading device corresponding to a second possible embodiment of the invention; and FIG. 4 is a sectional view of a preloading device according to a third embodiment form of the invention.

DETAILED DESCRIPTION OF THE PRESENTLY PREFERRED EMBODIMENTS

Figure 1:
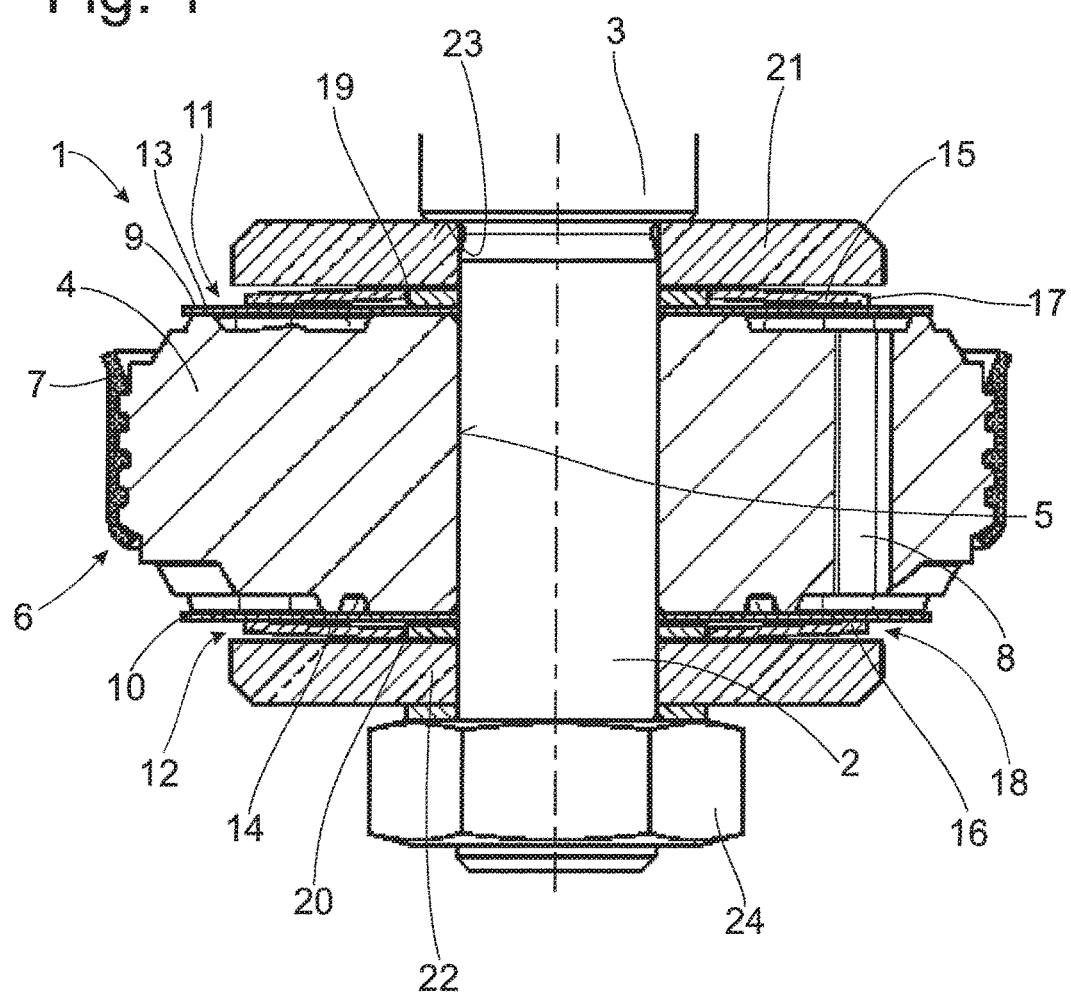
FIG. 1 is a sectional view of a piston valve of a shock absorber comprising a plurality of preloading devices corresponding to a first embodiment form of the invention.

FIG. 1 shows a sectional view of a piston valve 1 of a vibration damper which is provided at a piston rod neck 2 of a piston rod 3 of the vibration damper. As can be seen from FIG. 1, the piston valve 1 comprises a piston body 4 which is fitted by an inner diameter 5 to the piston rod neck 2 and carries a seal 7 at an outer diameter 6. In the fully assembled state of the vibration damper, the piston body 4 then makes contact with a cylindrical tube—not shown—of the vibration damper via seal 7 and in so doing separates a working space from a reservoir space.

The piston body 4 is axially penetrated by a plurality of passages, of which only one passage 8 located in the section plane is visible in FIG. 1. A damping medium of the vibration damper, preferably oil, can be displaced via the passages during in-and-out movements of the piston rod 3 between the spaces which are separated from one another by the piston body 4. The passages are covered in the region of their orifices by valve disks 9 and 10 which are each preloaded against a valve seat surface 13 and 14, respectively, at the piston body 4 in each instance via a preloading device 11 and 12, respectively.

The preloading devices 11 and 12 each have a spring element in the form of disk springs 15 and 16, respectively, which rest in the region of their respective outer diameters 17 and 18 on the respective valve disk 9 and 10 and are supported in the region of their respective inner diameters 19 and 20 at a respective supporting disk 21 and 22. Supporting disk 21 is provided axially between a piston rod neck shoulder 23 and preloading device 11, while supporting disk 22 lies axially between preloading device 12 and a fastening nut 24. The fastening nut 24 is guided on an outer thread of the piston rod neck 2 and preloads the components of the piston valve 1 in the form of the two supporting disks 21 and 22, the preloading devices 11 and 12, the valve disks 9 and 10 and the piston body 4 against the piston neck shoulder 23.

As a distinctive feature, the preloading devices 11 and 12 are each constructed as a preassembled component, the construction of which will now be described in detail with reference to the further sectional view from FIG. 2 using the example of preloading device 12. As will be seen from FIG. 2, the preloading device 12 has, in addition to the disk spring 16, a centering disk 25 and two retaining disks 26 and 27. Disks 25 to 27 are annular so that they can be slid onto the piston rod neck 2 together with the disk spring 16 in the course of assembling the piston valve 1. The centering disk 25 lies radially inside the disk spring 16 so that the disk spring 16 is fitted with its inner diameter 20 onto an outer diameter 28 of the centering disk 25 which accordingly forms a centering device 29 for the disk spring 16.

In the installed state of the preloading device 12, the centering disk 25 serves for inner centering of the disk spring 16 on the piston rod neck 2 as can be seen in FIG. 1. However, in order to prevent the disk spring 16 from creeping out axially relative to the centering disk 25 in the course of assembling the piston valve 1 and, further, to form the preassembled unit, the disk spring 16 is enclosed axially on both sides by the retaining disks 26 and 27 in the region of its inner diameter 20. The retaining disks 26 and 27 are in turn rigidly connected to the centering disk 25. To this extent, the retaining disks 26 and 27 fix the disk spring 16 indirectly at the centering disk 25, the disk spring 16 being inserted loosely between the two retaining disks 26 and 27. In the present instance, the retaining disks 26 and 27 are connected to the centering disk 25 by a joining process, preferably in the form of laser welding. Owing to the enclosing of the inner diameter 20 of the disk spring 16, the weld joints between the retaining disks 26 and 27 and centering disk 25 are not loaded by a spring force of the disk spring 16.

The preassembled preloading unit 12 is then simply slid onto the piston rod neck 2 in its entirety when assembling the piston valve 1, and the disk spring 16 then exerts its preloading force on valve disk 10 in the course of screwing on via the fastening nut 24. Preloading device 11 is arranged analogous to preloading device 12 and is merely mounted in a mirror reflection thereof. To this extent, as regards preloading device 11, reference is made to the description relating to preloading device 12.

FIG. 3 further shows a sectional view of a preloading device 30 which is realized in a manner corresponding to a second possible configuration of the invention and which can be applied in a piston valve as an alternative to preloading devices 11 and 12. In the case of preloading device 30, a spring element in the form of a disk spring 31 is also internally centered at an inner diameter 32 via a centering device 33.

Figure 2:
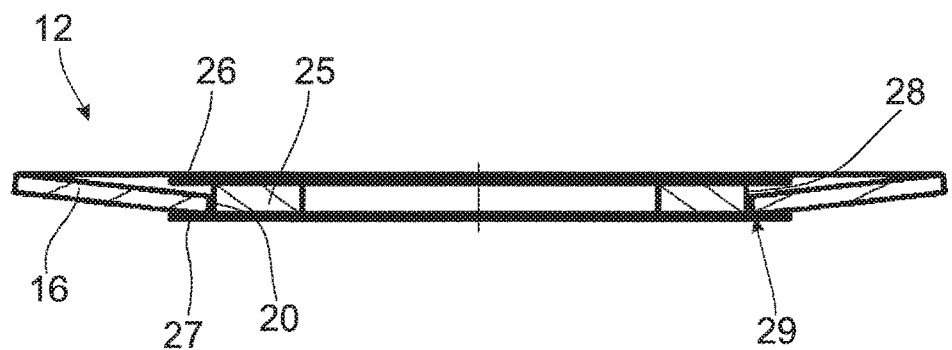
FIG. 2 is a sectional view of one of the preloading devices from FIG. 1.

In contrast to the preceding variant according to FIGS. 1 and 2, this centering device 33 is not formed by an independent disk but is defined by an outer diameter 34 of a flange portion 35 which is formed so as to project axially at a supporting disk 36. In this respect, an integration of functions is realized in that the supporting disk 36 which is to be provided subsequently in a piston valve in any case simultaneously also takes on the function of inwardly centering the disk spring 31.

In addition, the supporting disk 36 forms at a shoulder portion 37 an axial contact surface for the disk spring 31 and, accordingly, retaining means for fixing jointly with a retaining disk 38. In this case, the disk spring 31 is loosely held by its inner diameter 32 between shoulder portion 37 and retaining disk 38; however, shoulder portion 37 completely overlaps the disk spring 31 in radial direction. On the other hand, the retaining disk 38 extends radially only in the region of the inner diameter 32 so as to achieve the loose enclosing of the disk spring 16. The retaining disk 38 is then in turn fastened to the supporting disk 36 by a joining method, preferably by laser welding, in that the retaining disk 38 is placed on the flange portion 35 and subsequently connected to the latter.

Finally, FIG. 4 also shows a sectional view of a further preloading device 39 which is configured corresponding to a third embodiment form of the invention and can be applied in a piston valve as an alternative to preloading device 12 in FIGS. 1 and 2. Preloading device 39 corresponds largely to preloading device 30 from FIG. 3 in that a supporting disk 40 forms a centering device 43 for a disk spring 44 at an axially projecting flange portion 41 with an outer diameter 42 in this case also.

In contrast to the preceding variants, however, the supporting disk 40 is additionally outfitted on an axial side remote of the flange portion 41 with a hex exterior 45 and along a portion of its axial extension with an inner thread 46 so that it can additionally take on the function of the fastening nut 24 from FIG. 1.

Further, an axial fixing of the disk spring 44 relative to the flange portion 41, in addition to a shoulder portion 47 of the supporting disk 40, is realized via a valve disk 48 which encloses the disk spring 44 beyond its outer diameter 49.

However, since disk spring 44 additionally contacts shoulder portion 47 in the region of the inner diameter 50 of the disk spring 44, disk spring 44 is not loosely held between the two components but rather must be preloaded in the course of forming the preassembled preloading device 39. To this extent, a connection of the valve disk 48 to the flange portion 41 of the supporting disk 40 is loaded by a spring force of disk spring 44 so that a connection, preferably by means of laser welding, is to be configured in a corresponding manner. Finally, the shoulder portion 47 of the supporting disk 40 does not completely cover the disk spring 44 radially, but rather only covers it to about its center region.

With of the arrangements according to the invention for a preloading device for a piston valve, a reliable inner centering of a spring element can be realized, but a preassemblable constructional unit is also provided at the same time allowing a reduction of expenditure on assembly.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A preloading device for a piston valve of a vibration damper, comprising:
 a radially inner centering device;
 a spring element, said spring element fitted by an inner diameter onto said radially inner centering device which serves for inner centering of said spring element in an installed state of the preloading device;
 retaining means for axially fixing said spring element at said centering device, said retaining means at least partially enclosing said spring element axially on both sides and said retaining means being rigidly connected to said centering device by a joining process consisting of one of welding, soldering, gluing and integrally forming so as to form a preassembled constructional unit so that in assembling the piston valve, the preloading device is positioned as a single pre-aligned constructional unit for ease of assembly of said piston valve and for assured alignment of said preloading device in said piston valve.

2. The preloading device according to claim 1, wherein said centering device is formed by a centering disk having an outer diameter for guiding said spring element at said outer diameter.

3. The preloading device according to claim 1, wherein said centering device is formed by an outer diameter of an axially projecting flange portion of a supporting disk, said supporting disk being additionally defined by a radially extending shoulder portion of one of the retaining means.

4. The preloading device according to claim 3, wherein said supporting disk comprising a hex exterior on an axial side remote of said flange portion and further comprises an internal thread at an inner diameter at least along a portion of said flange portion.

5. The preloading device according to claim 1, wherein at least one of said retaining means is formed in each instance by a retaining disk which is connected to said centering device.

6. The preloading device according to claim 1, wherein said spring element is enclosed axially between said retaining means only in the region of an inner diameter of said spring element.

7. The preloading device according to claim 1, wherein one of said retaining means is formed by a valve disk connected to said centering device and wherein said spring element applies a preloading force to said centering device.

8. The preloading device according to claim 1, wherein said spring element is a disk spring.

9. A piston valve for a shock absorber, comprising:
 a piston body having at least one passage extending axially through said piston body, said at least one passage covered by at least one valve disk, wherein said at least one valve disk being preloaded against said piston body by the preloading device according to claim 1.

10. A piston valve for a shock absorber, comprising:
 a piston body having at least one passage extending axially through said piston body, said at least one passage covered by at least one valve disk, wherein said at least one valve disk being preloaded against said piston body by the preloading device according to claim 2.

11. A piston valve for a shock absorber, comprising:
 a piston body having at least one passage extending axially through said piston body, said at least one passage covered by at least one valve disk, wherein said at least one valve disk being preloaded against said piston body by the preloading device according to claim 3.

12. A piston valve for a shock absorber, comprising:
 a piston body having at least one passage extending axially through said piston body, said at least one passage covered by at least one valve disk, wherein said at least one valve disk being preloaded against said piston body by the preloading device according to claim 4.

13. A piston valve for a shock absorber, comprising:
 a piston body having at least one passage extending axially through said piston body, said at least one passage covered by at least one valve disk, wherein said at least one valve disk being preloaded against said piston body by the preloading device according to claim 5.

14. A piston valve for a shock absorber, comprising:
 a piston body having at least one passage extending axially through said piston body, said at least one passage covered by at least one valve disk, wherein said at least one valve disk being preloaded against said piston body by the preloading device according to claim 6.

15. A piston valve for a shock absorber, comprising:
 a piston body having at least one passage extending axially through said piston body, said at least one passage covered by at least one valve disk, wherein said at least one valve disk being preloaded against said piston body by the preloading device according to claim 7.

16. A piston valve for a shock absorber, comprising:
a piston body having at least one passage extending axially through said piston body, said at least one passage covered by at least one valve disk, wherein said at least one valve disk being preloaded against said piston body by the preloading device according to claim 8.

* * * * *